Dec. 14, 1965 H. GLASER 3,223,886

TELEVISION PICTURE SCREEN

Filed May 23, 1961 3 Sheets-Sheet 1

INVENTOR

Herbert Glaser

By Beaman & Beaman

Attys

Dec. 14, 1965

H. GLASER 3,223,886

TELEVISION PICTURE SCREEN

Filed May 23, 1961

3 Sheets-Sheet 2

INVENTOR

Herbert Glaser

By Beaman & Beaman attys

TELEVISION PICTURE SCREEN

INVENTOR
Herbert Glaser
By Beaman Beaman
attys

United States Patent Office 3,223,886
Patented Dec. 14, 1965

3,223,886

TELEVISION PICTURE SCREEN

Herbert Glaser, 62 Hammer Steindamm, Hamburg, Germany

Filed May 23, 1961, Ser. No. 112,013
Claims priority, application Germany, May 23, 1960, G 29,739
4 Claims. (Cl. 315—151)

This invention relates to a television picture screen having a group of line-like conductors and a group of column-like conductors, between the elected junctions of which an electric luminescence is produced.

In constructing television apparatus the size of the picture tube is of determining importance, and the development possibilities are closely limited by the dimensions of the picture tube, the danger of implosion caused by the evacuation, the high operating voltage, and the position depending ray deflectors. A separation of the receiving apparatus and using this known picture tube is not recommendable.

Luminescence plates are known serving illumination purposes. Furthermore it is known to divide the luminous surface into separate lines and their arrangement in picture points by correspondingly designing the electrodes engaging the luminescent layer, so that the luminous surface consists of a plurality of luminous picture points which are singly and successively fed to the television receiver.

By using semiconductors in thin layers it is possible to avoid the disadvantages of the known pictuer tube per se, because in this case in picture screen having a thickness of only a few millimeters with luminous surfaces of any desired size may be produced. Prior known circuits of light producing and light sensitive elements are not suitable for selecting lines and columns in a picture screen, because they are either present for other purposes serving as grating for converting different input signals to a new output signal, or because they do not use the fed-in impulse directly for feeding, but the feeding will occur timely delayed by a voltage variation in the circuit, which additionally requires further intermediate circuits.

It is also known to use a transfluxor for switching on each one of the light emitting elements. In this the arrangement of the selecting steps becomes so voluminous that the size of the luminous screen is increased considerably and practically forms an apparatus in itself. Furthermore it is known to use sliding contact switches for switching a screen, which on the one hand are considerably large, and on the other hand are not suitable for controlling a television pictuer screen.

The main object of this invention is to provide a television picture screen having a novel switching of the luminous picture points, by which it is possible to not only use very small dimensions for the picture screen, but also to render the transition from black-white pictures to coloured pictures possible.

Another object of the invention is to provide a television picture screen which may be hung on the wall like a picture.

Another object of the invention is to provide a television picture screen which does not require a wider frequency band for transmitting a coloured picture than for a black-white picture.

Another object of the invention is to provide a television picture screen in which no special carrier is necessary for controlling the succession of colours.

Another object of the invention is to provide a television picture screen in which the same sender and receiver may be used simultaneously for transmitting both types of pictures, without necessitating to change the existing television standard.

Another object is to provide a television picture screen in which the operating safety is increased by avoiding the large evacuated chamber of the picture tube and the danger of implosion connected therewith, thereby at the same time avoiding the picture distorting curvature of the picture screen, so that the picture will be produced on a perfectly plain surface.

Still another object of the invention is to provide a television picture screen in which shifting of the picture points relative to each other, as is the case in known picture tubes, is avoided.

An important feature of the invention must be seen in the control of the lines in an electric series connection of a radiation source—in particular of an electro-luminescence luminous field—comprising more than one radiation sensitive element, in which one radiation sensitive element for each step is used for switching on the preparedness of radiation of the radiation source, while a second radiation sensitive element is switching on the radiation, and in an electric parallel connection of one or more radiation sensitive elements to said radiation source for allowing the latter to radiate or not radiate in dependence on the radiation, wherein the controlling radiation may also originate from the controlled source of radiation.

An especially advantages embodiment of the invention provides that all conductors of each group are connected via radiation sensitive elements to two terminals to which the television signal is supplied; that each of said radiation sensitive elements is disposed within the radiation zone of a radiation generating element, wherein for the successive selection of the line conductors for each line a switch step is provided consisting of a series connection of the momentary radiation generating elements with at least two radiation sensitive elements, one of which serving to switch on the preparedness of radiation and one to switch on the radiation of the element; and that finally for successively selecting the column conductors the radiation generating element is electrically connected in series with the momentary radiation sensitive element and is associated with regard to radiation to the radiation sensitive element of the column conductor to be energized successively.

Preferably the two radiation sensitive elements are disposed within the radiation zone of the radiation generating element to be switched on, wherein the radiation sensitive element, which is switching on the preparedness of radiation, is additionally disposed within the radiation zone of the radiation generating element belonging to the preceding switching step, while the radiation sensitive element, which is switching on the radiation, is additionally disposed within the radiation zone of an additional radiation generating element, to which the line impulses are fed. In this an additional radiation sensitive element is disposed within the radiation zone of the momentary switched on radiation generating element, said additional radiation sensitive element being electrically connected in parallel with the radiation generating element of the preceding switching step.

According to an important feature of the invention at least two continuous switching chains are formed by the switching step associated with the line conductors, each switching chain switching on the line conductors of a fractional sweep, the start of the continuous switching in the continuous switching chains being initiated by a picture change impulse which is fed to a radiation generating element, within the radiation zone of which radiation sensitive elements are arranged. Switching on of a certain continuous switching chain is achieved by the indication of a certain picture change impulse (for example by a differing interval with regard to the successive first line impulse) with a certain timing constant of the switch-on elements, while the continuous switching in the additional continuous switching chains is initiated by additional picture change impulses having a different timing constant.

The radiation sensitive elements disposed within the radiation zone of the last mentioned radiation generating elements are electrically connected in series with additional radiation generating elements, and within their radiation zone the radiation sensitive elements of the first switching step of the continuous switching chains are disposed, which are switching on the preparedness of the radiation generating elements. The continuous switching within the other continuous switching chains is initiated by picture change impulses, by connecting one radiation generating and one radiation sensitive switch-on element in series, wherein the radiation sensitive switch-on element is disposed within the radiation zone of the radiation generating element, which is energized by the picture impulse, and is additionally disposed within the radiation zone of the radiation generating element, and the series connection is connected with the center of two additional radiation sensitive elements arranged in series which are connected to the source of current, wherein the one radiation sensitive element is arranged within the radiation zone of the radiation generating element of a switching step of the first continuous switching chain, while the other radiation sensitive element is disposed within the radiation zone of the radiation generating element of a switching step of the next chain to be switched on, wherein another radiation generating element disposed within the radiation zone of the first mentioned radiation sensitive element is connected in series to the last mentioned radiation sensitive element.

According to a preferred embodiment of the invention the start of the continuous switching of the column-like conductors is initiated by a radiation generating element, within the radiation zone of which the radiation sensitive element, electrically connected in series with the first column-like conductor, is arranged to which the line impulse is fed.

For a multiple scanned picture for achieving a multiple interlacing more than two continuous switching chains are provided, and for the transmission of coloured pictures a colour is associated with the line conductors switched on by each continuous switching chain, and two succeeding fractional sweep pictures are modulated with complementary colours, so that a picture signal modulated with a plurality of colours will generate a monochromatic picture in a black-white receiving apparatus. Preferably the radiation generating and the radiation sensitive elements are formed by thin layers which are mutually arranged on a carrier material.

Further advantages and features of the invention will become evident from the following description of one embodiment which is shown by way of example in the drawings attached thereto.

In the drawings.

In the drawings similar parts are marked with similar reference symbols.

On a carrier material, for example glass, light-transmissive electric conductors are arranged in form of lines 25–610 which are electrically insulated with respect to each other. Except for a small margin, serving as an electric terminal for the lines, these line electrodes are covered by an electro-luminescent layer 1001 which for a monochromatic picture may be continuous, while for a coloured picture each one of the lines is provided individually with differently coloured electro-luminescing semiconductor layers. The differently coloured semiconductor layers are repeated in certain groups. It is possible to produce the polychrome pictures by providing corresponding filters. On the luminescent layer column-like conductors 1′, 2′, 3′ . . . 781′ serving as counter electrodes are arranged vertically consisting of light-transmissive material or metal, said counter electrodes being electrically insulated with respect to each other and are also comprising exposed marging zones serving as electric terminals.

Each column-like conductor is crossing all lines and vice versa so that, when a source of current is applied to one column and to one line, the luminescent material disposed at the junction of the column and the line is under tension and may light up. In this way a plurality of luminescent picture points are produced having a surface area determined by the width of the columns and lines crossing each other. These picture points may be switched on individually by selecting one of the columns and one of the lines.

It is to be noted that the numbering of the lines starts out with the numeral 25, this being so because the line switch contains switching steps 1–24 which are associated with corresponding imaginary lines. These switching steps serve to bridge the flyback period provided in the picture signal. The corresponding vacant steps are disposed at the beginning of the switching groups of the line switch.

The fixed position of these picture points positively leads to a mathematically exact geometry of the picture. Distortions of the picture and mating of the lines are not possible. The fixed position of the picture lines is the presupposition for a coloured picture.

Figure 1:
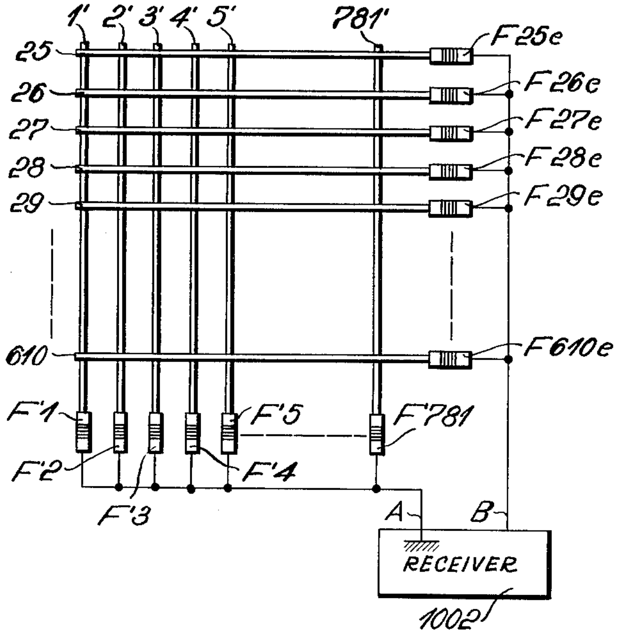
FIG. 1 is schematic top view of a semiconductor picture screen.

The switching-on of the lines is achieved, according to FIG. 1, by the radiation sensitive elements F25*e* to 610*e*. The switching-on of the columns is achieved by the radiation sensitive elements F′1 to F′781.

The video frequencies derived from the televison receiver 1002 are fed to the terminals A and B and further on via the irradiated luminous picture points. Only one radiation sensitive element for the columns and only one radiation sensitive element for the lines is irradiated at the same time, whereby the picture point will light up only then, if there is a voltage in the video signal at the time of switching-on of the picture point. The intensity of the light is dependent on the magnitude of this voltage. Preferably the counter electrodes, i.e., the column conductors for the radiation sensitive elements, are also radiation pervious, so that the irradiation of the radiation sensitive elements may be accomplished from the rear side of the picture screen.

Figure 2:
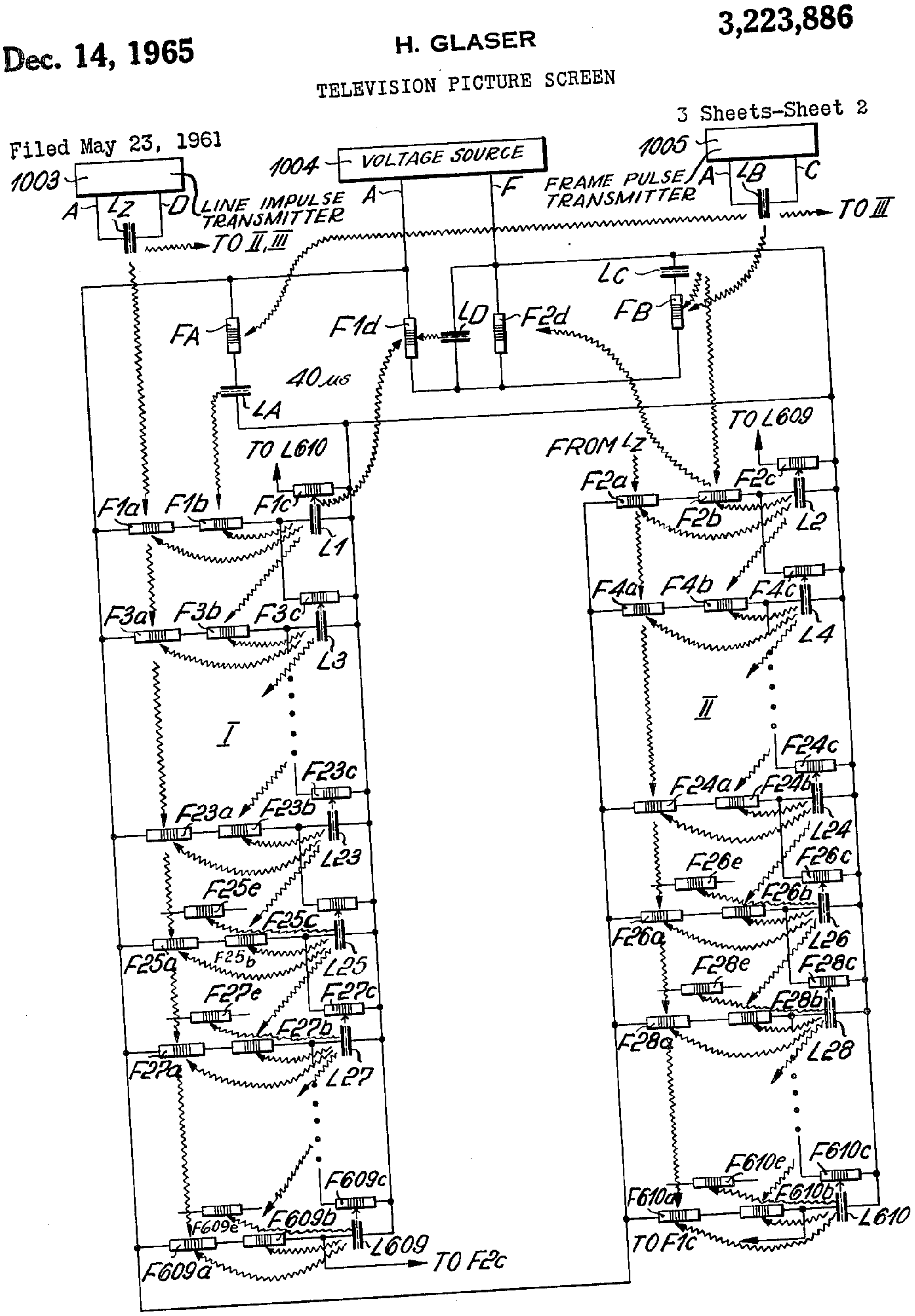
FIG. 2 is the arrangement of the switching step for the line switch.

The switching radiation for the lines is generated in the line switch, the circuit of which is shown in FIG. 2, which consists of a connection of radiation generating and radiation sensitive semiconductors which are also arranged in thin layers on the radiation sensitive elements. In this arrangement one switching step in the line switch is assigned to each line, said switching step comprising a radiation generating element which irradiates the radiation sensitive element of the assigned line, simultaneously serving for continuous switching of the switching step.

In order to achieve synchronism of the continuous switching of the lines with the scanning of the lines at the transmitter the line synchronizing impulses given by the transmitter are used. The picture synchronizing impulses assure a synchronized initiation of the line switching.

The line switch is, for example, divided into two groups I and II, of which the first group is switching the odd-numbered lines and the second group is switching the even-numbered lines, thereby maintaining the interlacing laid down by the television standard.

The switching-on of the correct partial picture is achieved by the picture synchronizing impulses variably given for each partial picture in such a way that, for transmitting the picture impulse to the first switching step of the line switch, switching-on steps consisting of radiation generating and radiation sensitive elements are switched with a timing constant modulated to the impulse sequence, whereby a certain switching group is switched on by a certain impulse. The continuous switching to succeeding switching groups may be achieved positively, whereby in one group sequence only one group needs to be designated by an impulse.

By means of this the extension of the single interlacing to a multiple interlacing is possible. Preferably this multiple interlacing is used for transmitting a plurality of colours, one switching group in the line switch being provided for each transmitted colour, said switching group always switching the lines of equal colour.

Provisions are made that always two succeeding partial pictures are designated with complementary colours which will complement in a picture screen operating with a single interlacing and also in the Braun picture tube to a correct black-white picture, but in a picture screen with a multiple interlacing and differently coloured luminescing luminous material a coloured picture will be produced. In this manner the same television signal may be seen behind the receiver simultaneously as a monochromatic picture with a monochromatic picture screen and as a polychromatic picture with a polychromatic picture screen.

When transmitting four colours the sequence of impulses is such that, instead of designating each second partial picture by the different long interval between the fifth flyback and the first line impulse in the picture change impulse, always the fourth partial picture is provided with this designation, or an additional impulse must be provided in order to avoid that variations occur in the synchronism of the black-white pictures.

In FIG. 2 the functioning of the line switch is illustrated. Instead of the radiation generating elements the expression lunminous fields is used in this example, and instead of radiation sensitive elements the expression photoconductor is used. In the upper part of FIG. 2 three switching steps of the television receiver are shown in an exploded manner representing the switching step for supplying the line impulses, the switching step 1004 in which the current source is arranged, and the switching step 1005 from which the picture impulse or frame pulse is transmitted. The switching steps are formed in a manner well known in television apparatus. The terminal A always designates ground.

In the drawing the radiation paths are illustrated by zigzag-like arrows. After the current source 1004 for the line switch is switched on at the terminals A and F none of the luminous fields L1 to L610 can light, because all of the photoconductors connected in series are unexposed their resistance being so high that the total voltage drops down.

When line impulses are received by the terminals A and D the lighting of the luminous fields $L_Z$ is without effect, as these luminous fields are only exposing the photoconductors designated with the index *a*.

The line switch begins to operate when a picture impulse on the terminals A and C causes the luminous field $L_B$ to light. This luminous field $L_B$ exposes the photoconductors $F_A$ and $F_B$. The luminous field $L_C$ cannot light, because the still unexposed photoconductor F1*d* is connected in series with the photoconductor $F_B$.

But by the exposure of the photoconductor $F_A$ the luminous field $L_A$ will light up during the period of the picture impulse. It has an afterglow time of more than 32 $\mu$sec. and less than 64 $\mu$sec. For example 40 $\mu$sec. are set, whereby it is distinguished whether the line switch is switching the first or second partial picture.

The sequence of synchronism of the European television standard designates the initiation of the first partial picture with a half line interval between the fifth flyback in the picture change impulse and the first line impulse, while before the initiation of the second partial picture a full line interval is transmitted at this place.

The afterglow period of 40 $\mu$s of the luminum field $L_A$ causes that also the photoconductor F1*b* is conductive only during this time. If a line impulse is received at the terminal D at this time, which by the light of $L_Z$ will also render photoconductor F1*a* conductive, the luminous field L1 receives voltage and can light. But this is the case only, before the initiation of the first partial picture. This assures that the partial pictures are switched on in the predetermined correct sequence.

The lighting of the luminous field L1 initiates the exposure of photoconductors F1*a* and F1*b* so that the luminous field will not be extinguished. Simultaneously the conductor for the preparedness of lighting of the switching step—in this case the photoconductor F3*b*—is exposed by the luminous field L1, in order to render the photoconductor F3*a* conductive, and to close the circuit for the luminous field L3 as soon as the next line impulse is received via the luminous field $L_Z$.

The luminous field L3 exposes the photoconductors F3*a* and F3*b*, and thereby maintains its own current supply. The also exposed photoconductor F3*c* is disposed in parallel in the preceding luminous field—in this case luminous field L1—and causes, upon becoming conductive, a break down of the voltage in the luminous field L1, and thereby its extinguishing.

At the luminous field L1 the *c*-photoconductor belongs to the step 610, because this step was lit as the last link of the second partial picture prior to the step during the current operation.

Always when a new line impulse is received the ignition passes through all odd-numbered steps, until after 305 line impulses step 609 is lighting.

Now the picture impulse for the second partial picture is received at the terminals A and C comprising a full line interval between the fifth flyback and the first line impulse. The photoconductance from the photoconductor will not exist anymore when the line impulse is received, and consequently the step 1 cannot light.

However, when the first partial picture is passed through also the photoconductor F1*d* of the luminous field L1 has been exposed and has lit the luminous field $L_D$. As the luminous field $L_D$ also exposes the photoconductor F1*d* the luminous field is lit during the entire interval of the first partial picture, and is still lit when the second picture is received. Now the exposure of the photoconductor $F_B$ by the luminous field $L_B$ can ignite the luminous field $L_C$. The light is maintained in that the luminous field $L_C$ also exposes the photoconductor $F_B$ besides the photoconductor F2*b*.

The first line impulse of the second partial picture will find the step 2 prepared to be ignited. The luminous field L2 maintains itself lit by the exposure of the photoconductors F2*a* and F2*b*. The luminous field L2 prepares the step 4 for ignition upon receiving the next line impulse by exposing the photoconductor F4*b*. The luminous field L2 extinguishes the last step L609 of the first partial picture by the exposure of the photoconductor F2*c*, and short circuits the luminous field $L_D$ by exposing the photoconductor F2*d*, causing the luminous field $L_D$ to extinguish. Simultaneously also the luminous field $L_C$ must extinguish, as the current supply is interrupted by the photoconductor F1*d* which is not conductive anymore.

After the second partial picture has passed the 305 steps the initial conditions are restored, except that the step 610 keeps on lighting and is extinguished only, when the luminous field L1 is ignited. This has no influence on the functional operating sequence but may be avoided by an additional vacant line step 611 which is self-extinguishing.

According to FIG. 2 the 610 switching steps are divided into two switching groups, as it is required for the interlacing of the black-white picture. It is achieved that with the interval of a half line in the picture impulse a certain partial picture is switched on. This exact change is also assured, when the received television picture contains more or less lines. This would not be the case, if the exposure of the photoconductor **F1*d* would take place by the luminous field L609**. The introduction of the luminous field $L_D$ assures the exact continuous group switching. An equal arrangement may also be connected with the second switching group, if it is intended that a plurality of switching groups are to follow. In this way the system may be extended, and the transition to a multiple interlacing involves no difficulties whatsoever.

In this way it is possible to achieve with three switching groups an exact interlacing for a television with three colours. With regard to the competition with the black-white television and the better miscibility of more colours for the intermediate shades, however, a fourfold interlacing with four colours is to be preferred. Probably this is possible without increasing the number of lines. This fourfold interlacing may easily be achieved by splitting up the line switch into four switching groups each having 305 steps, while the same signal for the black-white picture is used for the method of single interlacing used up to now.

For designation the correct colours by the transmitter it would suffice, if the sequence of four partial pictures would contain only once the half line interval between the fifth flyback of the picture impulse and the first line impulse. Therefore, the alteration consists in that always in the third partial picture—according to the manner of counting in the black-white method—the fifth flyback is shifted by about ⅙ length of a line closer to the main impulse. This alteration should not cause any noticeable influence on the interlacing of the tube. On the other hand the same effect is achieved, if one of the four partial pictures is designated by introducing a new impulse. The semiconductor picture screen may use this impulse, by adapting the duration of the afterglow of the luminous field $L_A$ in connection with the timing constant in the photoconductor $F_A$, to switch on the correct colour group.

Figure 3:
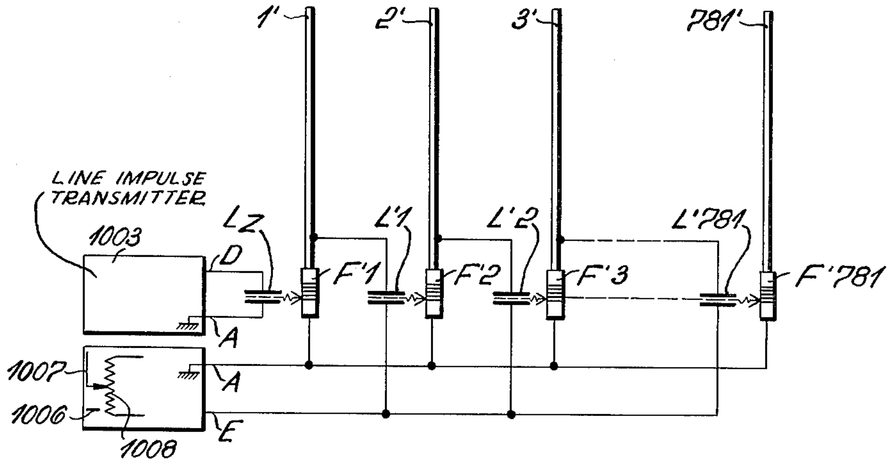
FIG. 3 is the arrangement for the column switch.

FIG. 3 shows the column switch. In this figure the switching steps of the television apparatus are illustrated, namely the switching step 1003 for the line impulse with the luminous field $L_Z$ and the switching step 1006 which includes a source of current. Switching on of the columns of the picture screen is caused by the column switch. Due to the more rapid sequence of switching the electro-luminescence luminous fields are in this case connected in such a way that the photoconductors F'1 to F'781, serving to switch on the columns, simultaneously represent the series-photoconductors of succeeding luminous fields, so that the lighting of the first luminous field L'7 by the exposure of the photoconductor F'1 causes the luminous field L'2 to light, and this one again to light the luminous field L'3, and so on, until all columns have been switched on once. Initially the field $L_Z$ lights. Thereby the resistance of F'1 is reduced. This causes the conductor 1' to be connected to a voltage and also causes the voltage across L'1 to be increased so that L'1 lights. The line impulse transmitter 1003 is constructed in such a manner that $L_Z$ is extinguished when L'1 lights. The succession is obtained by the inertia of the components.

Extinguishing of the luminous fields results automatically because they are operated with direct current voltage potential and the electroluminescence would only occur during the period of changing the electric field, i.e., at changes of the parallel connected resistance F'1, F'2, etc. In order to prevent the occurrence of a second luminescence by the increase of resistance of F'1, F'2 when switching off the field and after extinguishing of the associated luminous field, the luminous material has a rectifier effect preventing transmission of light when the field decreases. Such luminous materials are known.

The duration of luminesce is determined by the capacity of the luminous field L', the resistance of the photoconductor F' in the lit condition, and the magnitude of the voltage. These values are modulated with respect to each other in such a way that the duration of luminesce and the speed of continuous switching corresponds for all columns with the length of time of one line. This time may be adjusted by regulating the magnitude of voltage in the switching step 1006. This regulation may, for example, be achieved by adjusting the tapping 1007 on a potentiometer 1008.

The regulation of the voltage may be used for a defineable size variation of the picture, if suitably a size variation is caused in a vertical direction by altering the connectible number of lines.

For synchronously switching on the beginning of the columns the photoconductor F'1, connected in series with the luminous field L'1, is exposed by the luminous field $L_Z$ to which the line synchronizing impulse of the transmitter is fed through the terminals A and D.

By extinguishing the luminous fields the photoconductors become highly resistant again, so that the original conditions are restored again, after the last luminous field L'781 is extinguished. The initiation of a new switching sequence is dependent on the arrival of a line impulse. The arrangement also functions, if the line impulses arrive irregularly.

The continuous switching within the column is with a uniform voltage a material constant and invariable, thereby preventing the occurrence of picture distortions within the column.

The fact that the switching of the column is operating independently of the line switched on at the moment, makes it possible to use, in spite of the rapid succession of switching, luminous material of greater inertia, if the time between the switching on of the field and the occurrence of luminescence amounts to whole multiples of the line duration.

The column switch consists of thin layers 1009 of semiconductors which, in an analogous manner to the line switches, will be arranged on the free ends of the columns of the picture screen, or the photoconductors respectively which are arranged there already according to the description of the picture screen.

In this way the picture screen together with the deflector units is forming a rigid unit having a thickness of only a few millimeters and which may easily be hung on a wall. The connection between the television apparatus and the picture screen is made by a cable requiring six leads only, namely the described terminals A to F. The highest fed potential will be approximately 300 v., the highest current about 10 mA., whereby the dangers in operating a picture tube are avoided, the more so, as the semiconductor picture screen is operating under atmospheric pressure. For example, the video signal has about 200 v. and 10 $\mu$a., the picture impulse about 200 v. and 100 $\mu$a., the line impulse about 200 v. and 10 ma., the alternating current volt fed to the terminal F about 30 kHz., 200 v. and 100 $\mu$a., while the direct current voltage is about 200 v. and 100 $\mu$a.

The substantially decreased power requirement for operating the semiconductor picture screen facilitates the appliance of the television receiver with transistors. The switching on of the lines and columns needs no special attendance.

Figure 4:
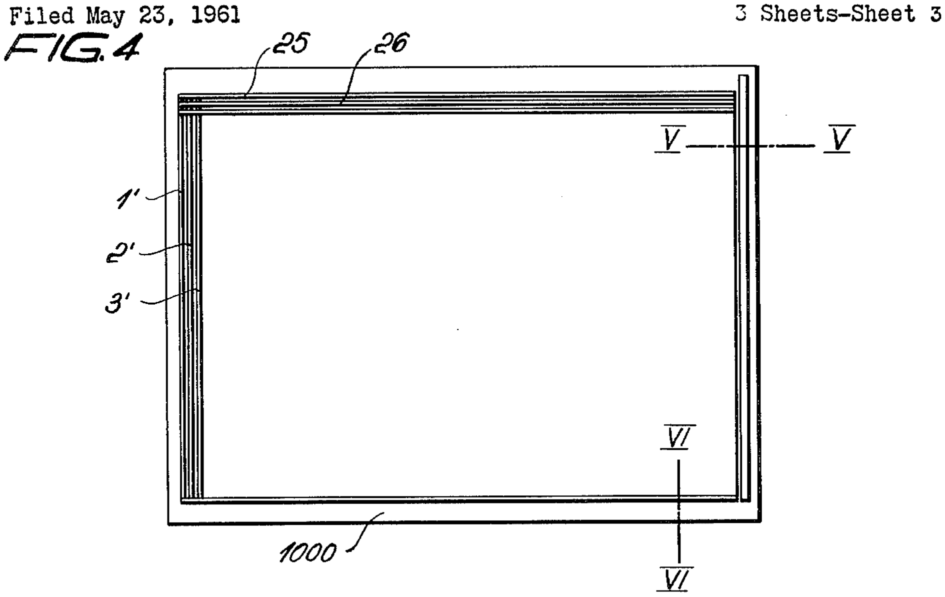
FIG. 4 is a top view of a picture screen.
Figure 5:
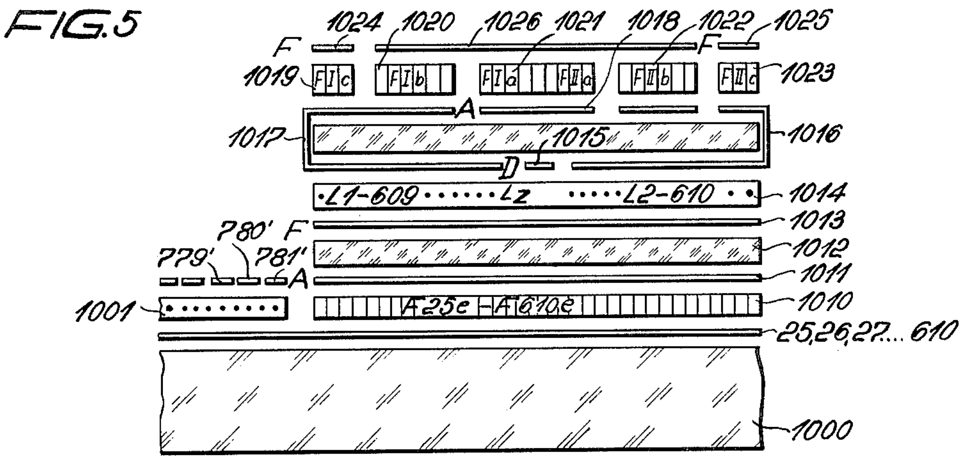
FIG. 5 is a section taken along the line V—V in FIG. 4 for illustrating the line switch.
Figure 6:
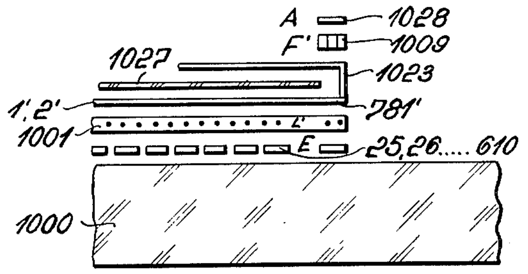
FIG. 6 is a section taken along the line VI—VI for illustrating the column switch.

The structure is particularly shown in the FIGS. 4 to 6. Line electrodes 25, 26 . . . 610 are arranged on the glass plate 1000. Upon these electrodes the luminous layer 1001 is applied and upon this one the column electrodes 1', 2' . . . 781' are disposed. At the terminal border for the lines a photoconductor layer 1010 having photoconductors F25*e* to 610*e* is arranged above the line electrodes 25, 26 . . . 610. Above this photoconductor layer 1010 there is arranged: an oxide electrode 1011 to which the video frequencies are fed, an insulating glass plate 1012, and again an oxide electrode 1013 which is connected with the switching step 1004 having a source of current the output of which being denominated with F.

On the electrode 1013 the luminous layer 1014 is arranged having the luminous field L1 to 609, $L_Z$, $L_B$, $L_C$, $L_D$, and L2 to 610 corresponding to the group-like arrangement according to FIG. 2. Over this luminous layer an oxide electrode 1015, which is connected with the terminal D of the line impulse transmitter 1003, and the electrodes 1016, 1017 and 1018 are arranged for establishing the connection with the photoconductor layer in which in a group-like fashion at 1019 the photoconductors $F_c$ of the group I, at 1020 the photoconductors $F_b$ of the group I, at 1021 left hand the photoconductors $F_a$ of the group II, at 1022 the photoconductor $F_b$ of the group II, and at 1023 the photoconductors $F_c$ of the group II are arranged. This layer of photoconductors also comprises the photoconductors $F_A$, $F_B$, F1*d*, F2*d*. Arranged over these groups there are metal electrodes 1024 and 1025 which are connected with the current feed terminal F of the switching step 1004, while the metal electrodes 1026 are forming the counter electrodes for the photoconductors disposed therebeneath.

In FIG. 5 a sectional exploded view is shown. It should be noted that the illustrated elements are shown to be partly displaced in the plane. This figure merely shows the schematic arrangement, while the switching arrangement is shown in other figures.

The column switch shown in FIG. 6 comprises a glass plate 1027 arranged over the column conductors 1′, 2′ . . ., over which the oxide electrodes 1028 are arranged which will connect the column conductors with the succeeding luminous field L′. On these electrodes are arranged the photoconductor layer 1009 comprising the photoconductors F′ (see FIG. 3), and over this photoconductor layer a metal electrode 1028 which is connected with the switching step 1006.

While the components of the invention may be constructed of known compositions which would perform the desired results, by way of example only, the following specific semiconductors and electrodes are satisfactory. The light controlled semiconductors may be formed of cadmium sulphide and cadmium selenide which are deposited by evaporation under a high vacuum. After an activating process at high temperatures with copper and tin, a layer of lead sulphide is deposited. The electrodes consist of a copper-indium alloy. The light-permeable electrodes consist of a thin layer of indium oxide and tin oxide deposited by evaporation under high vacuum.

What is claimed is:

1. A television image screen comprising, in combination, a group of parallel, spaced, line forming first conductors arranged in a sequential manner, a group of parallel, spaced, column forming second conductors arranged in a sequential manner and transversely related to said line forming first conductors and superimposed thereover, an electroluminescent material disposed between said first and second conductors whereby upon a voltage being applied to a first conductor and a second conductor the electroluminescent material disposed immediately therebetween will luminesce, a voltage source, a frame pulse source, a line impulse source, a first radiation sensitive electrical element associated with each of said second conductors selectively controlling voltage energization of the associated second conductor, a radiation source operatively associated with each radiation sensitive element adapted to selectively irradiate the associated element, means connecting the radiation sources of said second conductors in series with the adjacent sequentially prior second conductor, means connecting said line impulse source to the radiation source of the first conductor of said group of second conductors, means connecting said voltage source to said radiation sensitive elements of said second conductors, control means for said first conductors controlling voltage energization thereof, and means connecting said voltage, a frame pulse and line impulse sources to said control means.

2. In a television image screen as in claim 1 wherein said control means for said first conductors includes second and third radiation sensitive electrical elements connected in series with the radiation source of each first conductor, a line impulse radiation source, means connecting said line impulse source to said line impulse radiation source, said second radiation sensitive elements adapted to be irradiated by said line impulse radiation source, a frame pulse radiation source, means connecting said frame pulse source to said frame pulse radiation source, said third elements being irradiated in dependence upon the output of said frame pulse radiation source, the third elements of sequentially subsequent first conductors being irradiated by the radiation source of sequentially prior first conductors.

3. In a television image screen as in claim 2 wherein a fourth radiation sensitive electrical element is connected in parallel with each first conductor radiation source and irradiated by a sequentially subsequent first conductor radiation source whereby energization of said subsequent radiation source de-energizes the sequentially prior radiation source.

4. In a television image screen as in claim 3 wherein alternate first conductors define first and second series of operationally sequential first conductors, said frame pulse radiation source irradiating the third elements of the first conductors of each series of first conductors, and the radiation source of conductors of each series irradiating the third elements of the adjacent sequentially subsequent first conductors of the associated series.

References Cited by the Examiner

UNITED STATES PATENTS

| | | | |
|---|---|---|---|
| 2,895,054 | 7/1959 | Loebner | 250—213 |
| 2,920,232 | 1/1960 | Evans | 315—151 |
| 2,932,770 | 4/1960 | Livingston | 315—169 |
| 3,012,095 | 12/1961 | Skellett | 178—5.4 |
| 3,070,701 | 12/1962 | Wasserman | 250—213 |
| 3,142,819 | 7/1964 | Duinker | 178—5.4 |

DAVID G. REDINBAUGH, *Primary Examiner.*